(12) United States Patent
Le et al.

(10) Patent No.: US 9,798,941 B2
(45) Date of Patent: Oct. 24, 2017

(54) DRIVER VISUAL SENSOR BEHAVIOR STUDY DEVICE

(71) Applicant: Ford Global Technologies, LLC, Dearborn, MI (US)

(72) Inventors: Jialiang Le, Canton, MI (US); Manoharprasad K. Rao, Novi, MI (US); Lingxi Li, Zionsville, IN (US); Renran Tian, Zionsville, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 14/661,613

(22) Filed: Mar. 18, 2015

(65) Prior Publication Data

US 2016/0275361 A1    Sep. 22, 2016

(51) Int. Cl.
| | | |
|---|---|---|
| *G06K 9/00* | (2006.01) | |
| *G06F 3/16* | (2006.01) | |
| *G06F 3/01* | (2006.01) | |
| *G06K 9/62* | (2006.01) | |
| *G06F 3/00* | (2006.01) | |

(52) U.S. Cl.
CPC ......... *G06K 9/00845* (2013.01); *G06F 3/005* (2013.01); *G06F 3/012* (2013.01); *G06F 3/013* (2013.01); *G06F 3/167* (2013.01); *G06K 9/00597* (2013.01); *G06K 9/6265* (2013.01)

(58) Field of Classification Search
CPC .. G06K 9/00845; G06K 9/00832; G06F 3/01; G06F 3/012; G06F 3/167
See application file for complete search history.

(56) References Cited

U.S. PATENT DOCUMENTS

| | | | |
|---|---|---|---|
| 8,049,609 B2 | 11/2011 | Takahashi et al. | |
| 8,259,117 B2 | 9/2012 | Shuster et al. | |
| 8,487,775 B2 | 7/2013 | Victor et al. | |
| 8,915,738 B2 * | 12/2014 | Mannino | G09B 9/052 434/236 |
| 9,124,955 B2 * | 9/2015 | Geva | B60K 28/066 |
| 2008/0266136 A1 | 10/2008 | Diba | |
| 2011/0313259 A1 * | 12/2011 | Hatakeyama | A61B 5/18 600/300 |
| 2014/0058584 A1 * | 2/2014 | Weng | G06F 7/00 701/1 |

(Continued)

FOREIGN PATENT DOCUMENTS

CN    102764107 A    11/2012

*Primary Examiner* — David M Gray
*Assistant Examiner* — Michael Harrison
(74) *Attorney, Agent, or Firm* — Frank MacKenzie; Brooks Kushman P.C.

(57) ABSTRACT

A sensor test system may include a controller coupled to at least one test device and a sensor, the controller configured to receive test instructions including a plurality of test sequences, instruct at least one display unit to display an item based on the test sequences, receive response data from the test device indicative of a driver behavior, the response data including timing information and test device information, compile the response data based on the timing information and the test device information, receive sensor data acquired by the sensor during the test sequences, compare the compiled response data to the sensor data, and determine an accuracy of the sensor based on the comparison.

16 Claims, 4 Drawing Sheets

(56) References Cited

U.S. PATENT DOCUMENTS

2014/0160432 A1    6/2014   Brown, Jr. et al.
2014/0163329 A1    6/2014   Brown, Jr. et al.
2015/0363797 A1*  12/2015   Ramesh ............. G06Q 30/0201
                                                705/7.29

* cited by examiner

DRIVER VISUAL SENSOR BEHAVIOR STUDY DEVICE

TECHNICAL FIELD

This disclosure relates to driver monitor sensor testing.

BACKGROUND

The use of driver monitor sensors in vehicles is increasing. When driving, drivers focus their attention on the road and on various mirrors, displays and controls within the vehicle. Driver monitor sensors are used in the vehicles to determine the direction of vision of the driver. However, oftentimes these driver monitor vision sensors are not fully tested or evaluated prior to installation which may lead to the sensors providing erroneous data during operation of the vehicle.

SUMMARY

A sensor test system may include a controller coupled to at least one test device and a sensor, the controller configured to receive test instructions including a plurality of test sequences, instruct at least one display unit to display an item based on the test sequences, receive response data from the test device indicative of a driver behavior, the response data including timing information and test device information, compile the response data based on the timing information and the test device information, receive sensor data acquired by the sensor during the test sequences, compare the compiled response data to the sensor data, and determine an accuracy of the sensor based on the comparison.

A vehicle system may include a controller coupled to at least one test device and a sensor, the controller configured to instruct at least one display unit to display an item, receive response data indicative of a driver behavior from the test device and compare the response data to sensor data provided by the sensor, and determine an accuracy of the sensor based on the comparison.

A vehicle sensor test system may include a controller coupled to a first sensor and a second sensor, each configured to detect driver behavior, the controller configured to compare first data from the first sensor with second data from the second sensor and determine an accuracy of the second sensor based on the comparison.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a testing system for driver monitor vision sensors, which are commonly used in vehicles to detect where a driver is looking. Because vehicle systems are using data provided by such sensors at an increasing rate, it is important to have reliable and accurate sensors installed in a vehicle. Prior to installing a sensor, it is beneficial to test the sensor in order to avoid issues after installation, which may proceed to be costly and time consuming. The system herein includes multiple displays within a test vehicle, arranged at locations where a driver may typically look when driving a car (e.g., heads-up display, rear view mirror, etc.) A user, or test driver, may sit in the driver seat. The driver's head may be observed during the test, wherein the driver may move his or her head/eyes from one display to another. A central controller may instruct the displays to illuminate, or display certain objects such as numbers or letters. The controller may also instruct certain audio commands to help facilitate testing. During testing, the head position, among other attributes of the driver, may be recorded using various test devices such as ground truth sensor(s) and/or reference camera(s). A driver controlled timer or timing device 150 may also be used to indicate how long the driver looked at a certain display. The data collected by these various devices may be used and compared to data collected by a driver monitor vision sensor within the test vehicle. Based on this comparison, the driver monitor vision sensor may be evaluated for its accuracy. Because a standard test with several sequences is controlled and commanded by the controller, driver monitor vision sensors may be easily swapped out and tested at a fast rate, thus increasing the reliability of driver monitor vision sensor data across vehicles.

Figure 1:
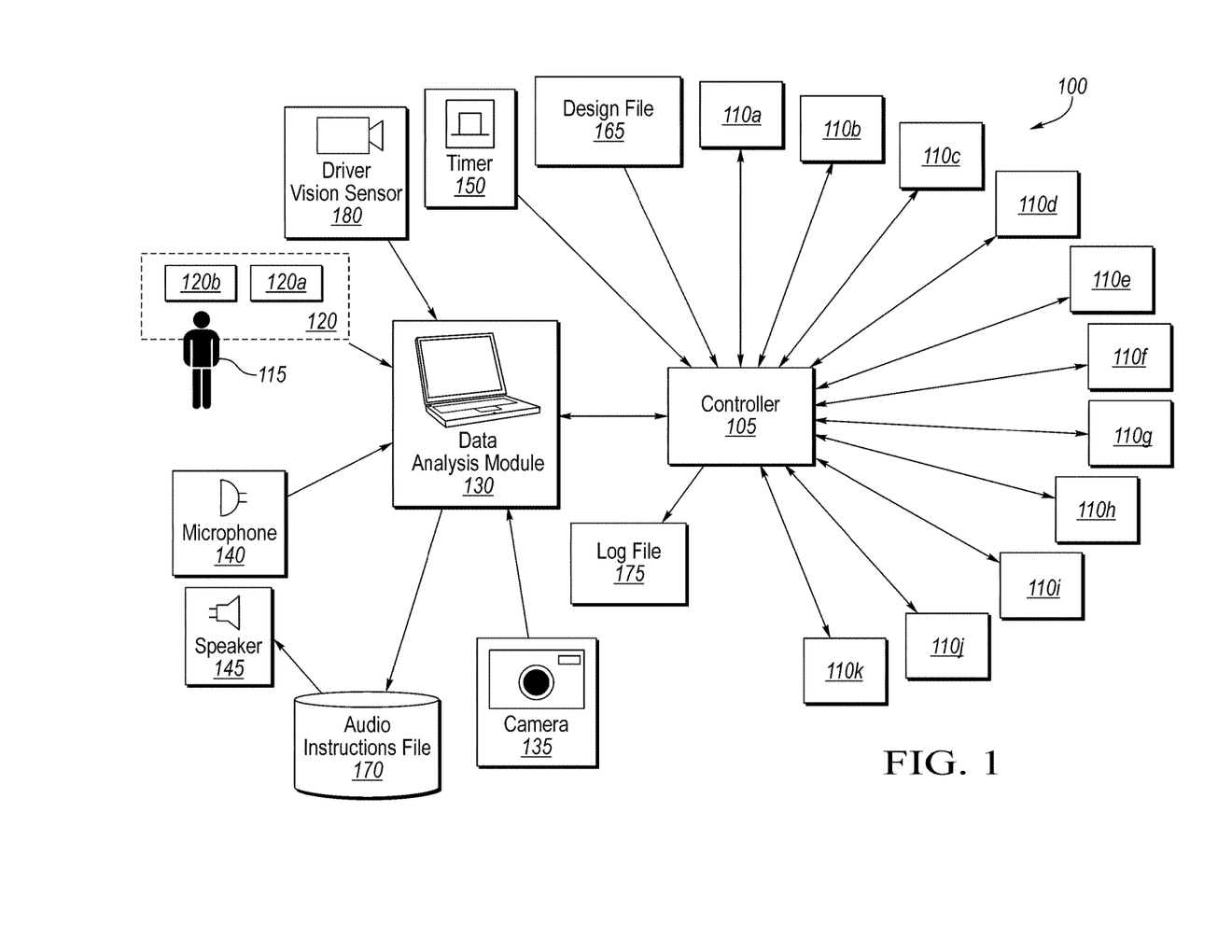
FIG. 1 illustrates an exemplary sensor test system for a driver monitor vision sensor.

FIG. 1 illustrates an exemplary sensor test system 100 for a vehicle driver monitor vision system comprising a controller 105 having a memory and a processor programmed to transmit instructions to a plurality of display units 110 (as shown as display units 110a-110k). The display units 110 may be any one of, or a combination of visual displays such as light emitting diodes (LEDs), organic LEDs (OLEDs), Active-Matrix Organic Light-Emitting Diode (AMOLEDs), liquid crystal displays (LCDs), thin film diodes (TFDs), cathode ray tube (CRT), plasma, capacitive or resistive touchscreen, etc. The display units 110 may be instructed to display items, numerals, objects, letters, etc., to a user 115 within the vehicle in order to direct the user's attention to a specific unit 110. The controller 105 may test a driver monitor vision sensor 180 by providing a plurality of test sequences to the display units 110. Each test sequence may include specific instructions for one or both of an audio command and visual indication on one of the display units. For example, a first sequence may display a letter on display unit 110a. A second sequence may display a number on display unit 110b. For each sequence, the user 115 may look at the illumined display unit 110. As described herein, various devices are used to collect data regarding the user's visual direction during a sequence. The data may then be used by the controller 105 to evaluate the accuracy of the driver monitoring vision sensor 180. These devices and test processes are described in more detail herein.

The controller 105 may be in communication with a ground truth sensor 120. The ground truth sensor 120 may be a position sensor arranged within the vehicle to detect the position and direction of the user's head. The ground truth sensor 120 may be capable of detecting the head position and direction of the user 115 via imaging, such as video imaging with multiple vision sensors. In one example, the ground truth sensor 120 may be an electromagnetic tracker system, such as the PATRIOT™ Wireless Tracking system provided by the Polhemus Company™, Colchester, Vt., 05446. Any other suitable head position and direction monitoring system which can monitor the driver head position and direction may be used as a ground truth system. The ground truth sensor 120 may be configured to transmit first driver data back to data analysis module 130, described herein. The ground truth sensor 120 may include a pair of sensors, such as a first sensor 120a and a second sensor 120b. First sensor 120a may be a base sensor installed in the vehicle near the user's head and the second sensor 120a may be a moving sensor fixed to the user's head via a hat or headband. Together, the first and second sensors 120a, 120b may provide quantitative ground-truth data such as head rotation Roll-Pitch-Yaw (RPY), as well as head position coordinates X, Y, Z.

At least one camera 135 may be in communication with the controller 105 and configured to supply imaging data to data analysis module 130. Such imaging data may indicate certain head movements made by the user 115 and may be used by data analysis module 130 in evaluating a driver monitor vision sensor 180. The camera 135 may be a camera capable of taking video and detecting user head and eye movement. The camera 135 may include multiple cameras and the imaging data may be used by the data analysis module 130 for qualitative analysis. For example, the imaging data may be used to determine if the user is looking at the correct location and whether the user is following instructions. Additionally or alternatively, the imaging data may also supplement timing information as it relates to the driver head motion, described below.

The controller 105 may be in communication with the data analysis module 130. The data analysis module 130 may include a processor and a controller programmed to receive and transmit data to the controller 105. While FIG. 1 shows the data analysis module 130 and the data controller 105 as separate devices, each may perform the functions of the other with a single integrated controller in some embodiments. Furthermore, while the data collection device is shown as being in communication with a microphone 140 and a speaker 145 and the controller 105 is shown as being in communication with a user timer 150, each may be in communication with one or more of the microphone 140, speaker 145 and timer 150. Moreover, the controller within the data analysis module 130 may perform any or all functions that the controller 105 is described as performing.

The microphone 140 may be an in-vehicle microphone configured to receive an audible response from the user 115. The speaker 145 may be an in-vehicle speaker configured to audibly transmit commands to the user 115. The user timer 150 may be a timer configured to track the time of certain events based on user feedback. For example, the user 115 may depress a button on the timer 150 indicating the beginning of an event. The user 115 may also depress the button indicating the end of the event. This timing information/data may be transmitted to the controller 105.

The system 100 may also rely upon various files and test instructions to implement the testing procedure. As shown in FIG. 1, a sequence design file may be accessed by the controller 105. The controller 105 may be programmed to instruct the display units 110 to display certain items in a certain sequence based on the design file 165. The sequence may include certain on/off sequences for the display units 110.

An audio instruction file 170 may be called upon by the data analysis module 130 or the controller 105, and the controller 105 may be programmed to instruct the speaker 145 to play certain audio commands based on the audio instruction file 170. For example, the commands may include a phrase such as "What number is visible on display number four?" To these commands, the user 115 may audibly answer, which may be received and transmitted to the controller 105 by the microphone 140.

A log file 175 may be called upon by the controller 105 for maintaining all commands and responses. Specifically, the log file 175 may catalog responses from the controller data including data from the timer 150, microphone 140, and others. The responses may be associated with a certain sequence based on the timing of that sequence and/or expected response. For example, if a first display unit 110a is illuminated in response to instructions based on a first sequence supplied by the design file 165, the log file 175 may store any responses received within a certain time frame of the illumination. The stored responses may be associated with the first sequence within the log file 175 and may include data received from at least one of the data sources including the hand timer 150, microphone 140, and others, relating to the timing of the on/off sequences for the display units 110. The log file 175 may also maintain which randomly generated image (e.g., numbers/letters) are displayed and when, to later correlate the accuracy of the driver's response to these displays.

The driver monitor vision sensor 180 may be included in the system 100 and may be evaluated by the controller 105. As explained, the driver monitor vision sensor 180 may be a sensor that will eventually be installed into a vehicle for end-customer use. The driver monitor vision sensor 180 may be easily removed and installed so that multiple driver monitor sensors may be tested using the system 100 for development.

Figure 2:
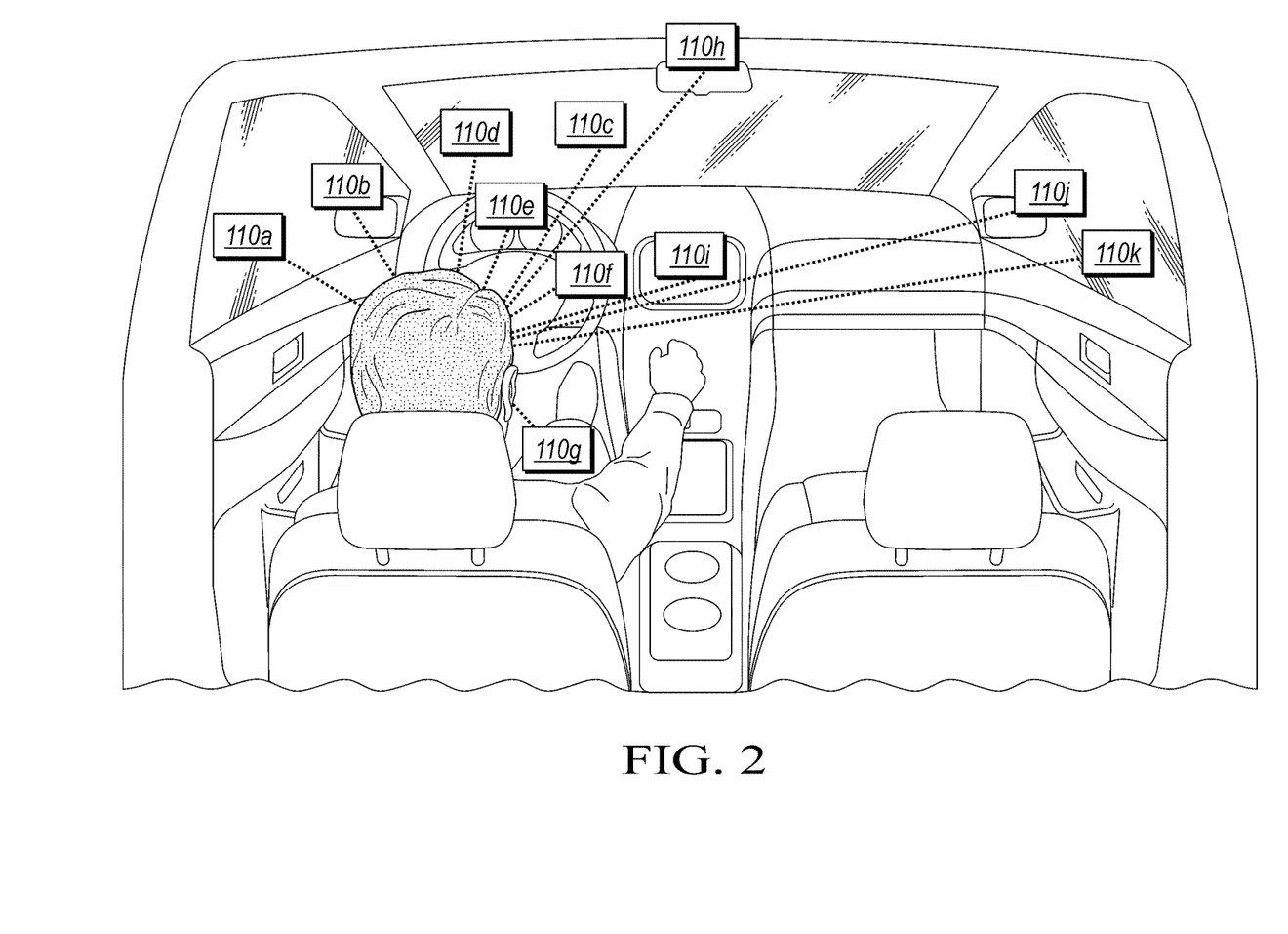
FIG. 2 illustrates an exemplary vehicle view of the test system of FIG. 1.

FIG. 2 illustrates an exemplary vehicle cabin view of the test system 100. The display units 110 may be arranged throughout the cabin of the vehicle in locations that are typically viewed by a driver. For example, display units 110 may include a driver side window unit 110a, a driver side mirror unit 110b, a look forward unit 110c, a heads-up-display (HUD) unit 110d, a dashboard unit 110e, a steering wheel unit 110f, a lap unit 110g, a rear-view mirror unit 110h, a central display unit 110i, a passenger side mirror unit 110j, a passenger side window unit 110k, among others. Although not shown, other locations may also include display units 110. The sensor test system 100 may use the display units 110 to instruct the user 115 where his or her eyes and head should be directed. For example, if central display unit 110k is illuminated, the user 115 may look at that unit. By controlling user/driver behavior (e.g., head position and looking direction), the test system 100 may perform a controlled analysis of the driver monitor vision sensor 180.

Figure 3A:
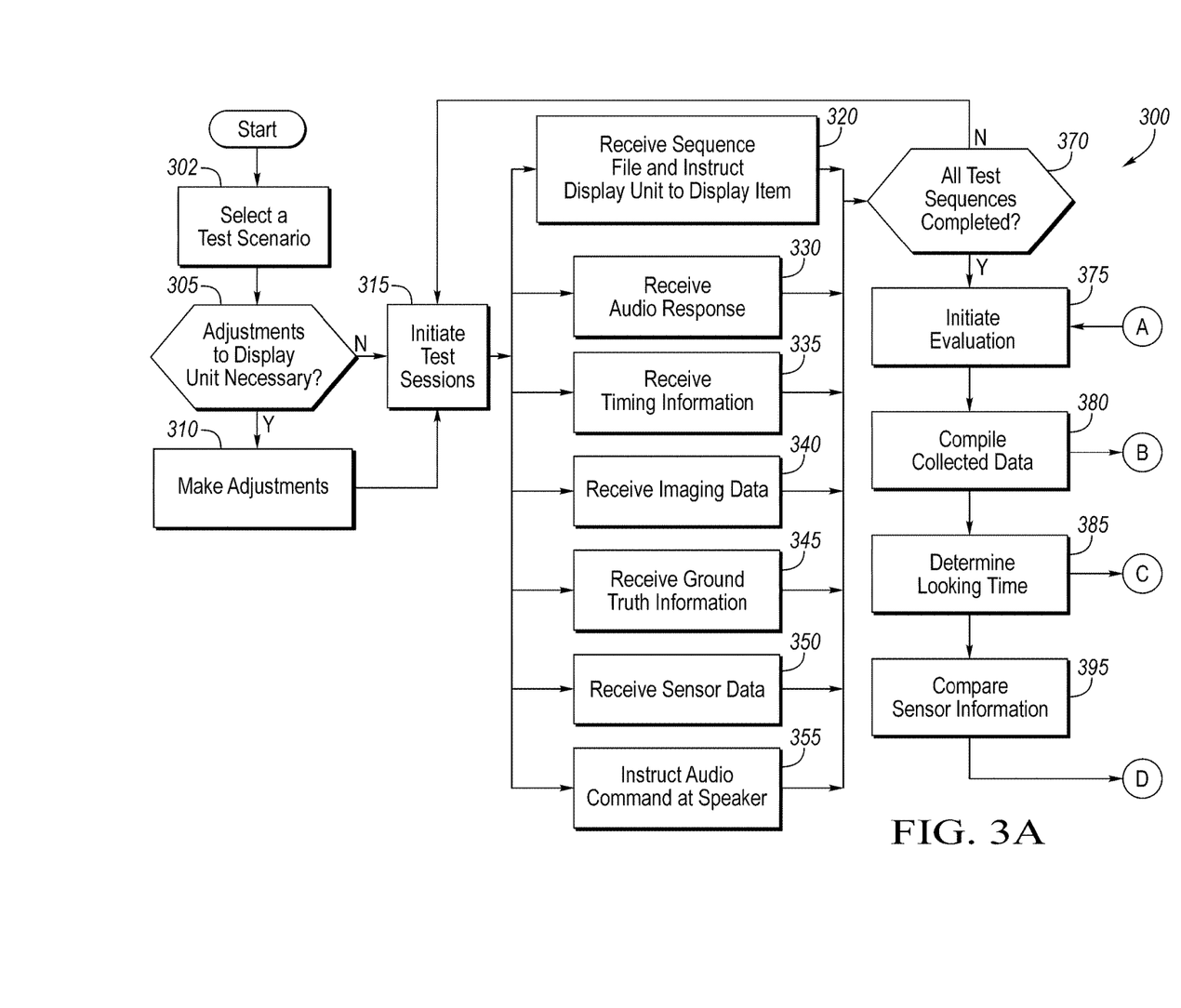
FIGS. 3A and 3B illustrate an exemplary process for the test system.
Figure 3B:
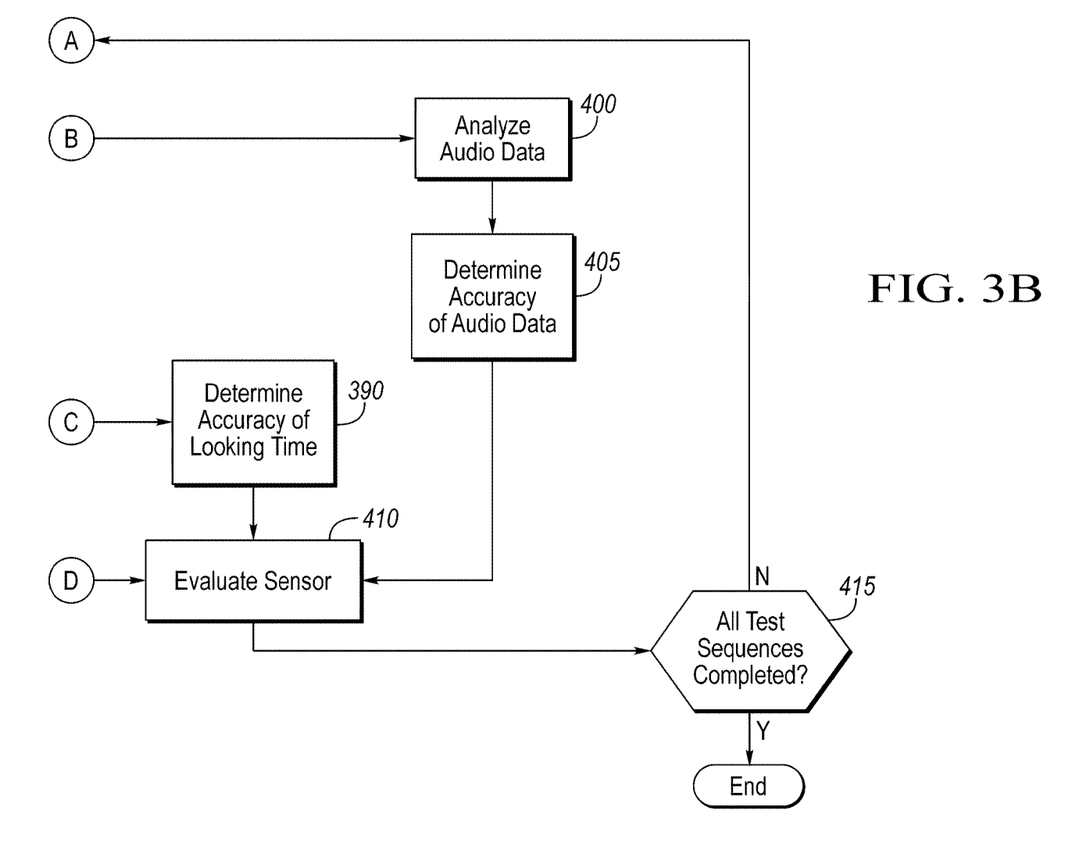

FIGS. 3A and 3B illustrate an exemplary process 300 for testing the accuracy of the driver monitor vision sensor 180 based on data received from the user 115 (e.g., microphone 140 and timer 150), as well as ground truth sensors 120a, 120b and camera 135.

The process 300 begins at block 302 by the selection of a test scenario from the design file 165. At block 305, the controller 105 determines whether visual output adjustments for the display units 110 are to be performed. For example, the user 115 may select different sizes and colors of the LEDs. Adjustments to the display units 110 may be made in an effort to control the amount of attention desired by the user when looking at a specific display unit 110. For example, a display unit 110 made up of LEDs may use colors with poor contrast or low intensity to force the user's full attention to that display unit 110 in part because the user will be required to focus more in an effort to see the display unit 110. In contrast, large LEDs at the display unit 110 with contrasting colors may be used to permit brief glances at the unit 110. Adjustments may be also made to the audio instructions. Such adjustments may depend on the location of the display unit 110. For example, some display units may be in close proximity with the user 115 while others are further away, requiring larger LEDs.

At block 310, the controller 105 instructs the display units 110 to adjust the visual outputs. For example, the size of one or more visual outputs may be changed at the display units 110, depending on their location.

At block 315, the process 300 proceeds to initiate the test session which may include multiple test sequences. For each sequence, the processes in one or more of blocks 320-355 may be performed.

At block 320, the controller 105 may receive a sequence file related to the scenario selected in block 302 from the design file 165. The sequence files may include at least one instruction dictating a sequence of events, such as which display units 110 are to display items and in which order. In one example, the sequence file may indicate that the driver side window unit 110a is to display a random numeral. In another example, another unit may display a shape, or simply illuminate. The items displayed by the display units 110 may be formed via the LEDs, or other display mechanisms depending on the type of display. Other exemplary instructions may include displaying a randomly generated number, displaying a specific color of the item, etc. The controller 105 may instruct at least one of the display units 110 to display an item as indicated by the sequence.

At block 330, the controller 105 may receive an audio response from the user 115 via the microphone 140. The controller 105 may include a voice recognition system and may be configured to convert the audio response into digital format which may be stored in the log file(s) 175, as explained below with respect to block 400. The audio response may include any number of responses audibly conveyed by the user 115. In one example, the user 115 may audibly convey what the user 115 sees on the display unit 110. For example, if a randomly generated letter is displayed, the user 115 may recite that letter. Additionally, the user 115 may indicate which of the display units 110 displayed the item. As shown in FIG. 1, the audio response may be transmitted to the data collection device. Additionally or alternatively, the controller 105 may receive the audio response directly.

At block 335, the controller 105 may receive timing information/data from the timer 150. The timing information may indicate how long the user was actually looking at the respective display unit 110. As explained above, the timer 150 may be operated by the user's hand.

At block 340, the controller 105 may receive imaging data from the camera 135 indicative of head movement and/or position.

At block 345, the data analysis module 130 may receive ground truth data from the ground truth sensors 120a, 120b. As explained above, the ground truth information may include driver head movement and/or driver looking direction acquired via an electromagnetic tracker system, and/or other high accuracy and high resolution vision system.

At block 350, the data analysis module 130 may receive second data, or sensor data, from the driver monitor vision sensor 180. The second data may include second data similar to the data acquired from the ground truth sensor 120 including second head position and second looking direction.

At block 355, the controller 105 may instruct the speaker 145 to emit certain commands. These commands may include instructions for the user 115 such as "Please identify the number shown in display unit number 10."

At block 370, the controller 105 may determine whether the test session is completed. For example, the controller 105 may determine if all of the sequences have been performed. If so, the process 300 proceeds to block 375. If not, the process 300 returns to block 315.

At block 375, the process 300 proceeds to evaluate the test session which may include multiple test sequences. For each sequence, the processes in one or more of blocks 380-410 may be performed.

At block 380, the controller 105 may compile all of the data in a log file 175, for the ground truth sensor 120, and driver monitor vision sensor 180. Compilation of this data may include categorizing the data based on a time stamp associated with each piece of data. This compilation allows the data to be organized by the respective sequence for which it was collected. The compilation will also allow the driver monitor vision sensor 180 to be better evaluated, as described below. For example, the time stamp associated with each data point may also be used to evaluate whether the driver monitor vision sensor 180 is performing as expected when compared to other data (e.g., timing information supplied by the user 115).

At block 385, the controller 105 may assess (or estimate) the exact driver looking direction time (including start/end time) of each glance provided by the timer 150. This driver looking direction time may be adjusted based on the imaging data supplied by the camera 135. For example, the imaging data (via the head movement) may indicate that the user 115 began looking at display unit 110a at t+0.75 seconds and looked away (e.g., looked elsewhere) at t+2.45 seconds. The timer 150 operated by the user 115 may indicate that the user 115 clicked the timer at t+0.78 seconds and at t+2.50 seconds. Thus, the imaging data may be used to correct timer data in the event that discrepancies (e.g., human errors) were detected in the timer data. The driver looking direction time indicates how long the user was looking at a specific display unit 110.

In one embodiment, at block 390, the controller 105 may determine whether a discrepancy exists between the timing information and imaging data with respect to the indicated driver looking direction times. For example, if a large discrepancy exists (e.g., a difference in time exceeding a predefined threshold) between the driver looking direction time as determined by the imaging data and the timing information as supplied by the timer 150, the timing information may be disregarded and/or set aside for additional analysis.

At block 395, second data from the driver monitor vision sensor 180 will be compared with the ground truth sensor 120 first data. For example, the ground truth data (e.g., the head movement information) supplied by ground truth sensor 120 may be compared to the second driver monitor vision sensor information (e.g., the second head position and second looking direction) supplied by the driver monitor vision sensor 180. Once compared, the data may be used to create an angular output relating to the head position for each sequence. For example, angular output of the user's head may be determined when the user 115 was looking at display unit 110a. Another angular output may be determined when the user 115 was looking at display unit 110b, and so on.

At block 400, the controller 105 may analyze the audio response data received via the microphone 140 in an effort to extract verbal responses recorded by the user 115. For example, these responses may include verbally stated numbers or letters. The controller 105 may include audio recognition software capable of converting the audio response data to a digital representation of the same and associate the "number" with a time stamp of when it was received.

At block 405, the controller 105 may compare the received audio response data with an expected response received from the audio instruction file 170, log file 175 and/or the design file 165. As explained, the design file 165 may provide instructions for a specific sequence to display a random number on a certain display unit 110. With each random number generated, the log file 175 may catalog or save the number with a time stamp, thus associating the number with the sequence running at that time. The controller 105 may compare the letter or number verbally stated by the user 115 with the saved letter to determine that the numbers and/or letters match. This comparison may be used by the controller 105 to evaluate the driver monitor vision sensor 180, but may also be used to simply indicate whether the user 115 was paying attention to the intended display unit 110 during the test. It may be also used to further engage the user 115 during testing to hold the user's interest so that active participation may be acquired.

At block 410, the data analysis module 130 may evaluate the driver monitor vision sensor 180 based on the determinations and comparisons made in blocks 380-405. That is, the data generated by the driver monitor vision sensor 180 may be compared with the data from the ground truth system 120, as well as the reference data from the reference devices including camera 135, microphone 140, and timer 150. For example, the driver monitor vision sensor 180 may provide the data analysis module with driver monitor vision sensor data that includes driver looking direction and time. The driver looking direction time from driver monitor sensor 180 may be compared to the determined driver looking direction time (as determined in blocks 385 and 390), while the driver looking direction from driver monitor vision sensor 180 may be compared with the angular output as determined in block 395. The audio data accuracy in block 405 provides an additional filter on the comparison to eliminate the results containing obvious human errors. For example, the continued mismatch between the user-reported number/letter and the ones shown on the display unit may indicate bad data which need to be disregarded. The degree to which the driver monitor vision sensor data matches that of the determined driver looking time and the angular output will be scored using statistical models, then the driver monitor vision sensor 180 may be judged by the data analysis module based on the scores for all the test sessions. Using the described process, the scores for different driver monitor vision sensors 180 are homogeneous enabling the comparison among different products.

At block 415, data analysis module 130 may determine whether each sequence has been evaluated. If so, the process 300 ends. If not, the process 300 returns to block 375. Accordingly, a test system is described by which the accuracy and usability of a driver monitor vision sensor 180 may be determined. The test system may acquire data from multiple sources distinct from the driver monitor vision sensor 180. The data may then be correlated to provide data indicative of location or direction of driver gaze and time. This correlated data may then be compared to the data provided by the driver monitor vision sensor 180. By comparing the data, the controller may determine the accuracy of the driver monitor vision sensor 180.

Computing devices, such as the mixer, remote device, external server, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments not specifically described or illustrated.

What is claimed is:

1. A sensor test system comprising:
a controller coupled to at least one test device and a sensor, the controller configured to:
receive test instructions including a plurality of test sequences;
instruct at least one display unit to display an item based on the test sequences;
receive response data from the test device indicative of a driver behavior, the response data including timing information, test device information, and at least one first head position and first looking direction;
compile the response data based on the timing information and the test device information;
receive sensor data acquired by the sensor during the test sequences;
compare the compiled response data to the sensor data, wherein the first head position and first looking direction of the response data are compared to a second head position and second looking direction of the sensor data; and
determine an accuracy of the sensor based on the comparison.

2. The system of claim 1, wherein the controller is further configured to instruct a speaker to emit audio instructions indicative of a desired driver behavior based on the test instructions.

3. The system of claim 1, wherein the response data includes an audio response acquired at a microphone and timing information acquired from a timing device.

4. The system of claim 1, wherein the sensor is a vision sensor.

5. A vehicle system comprising:
a controller coupled to at least one test device and a sensor, the controller configured to:
  instruct at least one display unit to display an item;
  receive, from a test device, response data,
  compare a head position and looking direction of the response data to a head position and looking direction of the sensor data provided by the sensor; and
  determine an accuracy of the sensor based on the comparison.

6. The system of claim 5, wherein the response data includes reference data received from a reference device, and includes at least one of an audible response, timing data, and imaging data.

7. The system of claim 6, wherein the reference device includes at least one of a vehicle camera, a microphone and a timing device.

8. The system of claim 5, wherein the controller is further configured to instruct a speaker to emit audio instructions indicative of a desired driver behavior.

9. The system of claim 5, wherein the at least one display unit includes a plurality of display units arranged within a vehicle cabin.

10. The system of claim 5, wherein the controller is configured to instruct one of the display units to illuminate for a predefined amount of time.

11. The system of claim 5, wherein the controller is further configured to instruct one of the display units to display a randomly generated image.

12. The system of claim 11, wherein the response data includes at least one audible response received at a microphone indicative of the randomly generated image.

13. The system of claim 5, wherein the controller is further configured to receive timing information from a timing device.

14. A vehicle sensor test system comprising:
a controller coupled to a first sensor and a second sensor, the controller configured to compare first data from the first sensor indicative of at least one head position and looking direction of a user with second data from the second sensor indicative of a driver gaze direction and determine an accuracy of the second sensor based on the comparison.

15. The system of claim 14, wherein the controller is further configured to determine an accuracy of the second sensor based on additional reference data received from reference devices including at least one of a camera, a timing device and a microphone.

16. The system of claim 15, wherein the reference data includes at least one of imaging data, timing data and audio data.

* * * * *